United States Patent Office 3,476,802
Patented Nov. 4, 1969

3,476,802
N-ALKYL DERIVATIVES OF 3,5-DIACETAMIDO-2,4,6-TRIIODOBENZOIC ACID AND SALTS THEREOF AND PROCESS FOR PREPARING THE SAME
Hugo Holtermann, Hovik, Baerum, Leif Gunnar Haugen, Grefsen, Oslo, and Nils Thorsdalen and Knut Tjonneland, Oslo, and Knut Wille, Roa, Oslo, Norway, and Jean Koutroulos, Lausanne, Switzerland, assignors to Nyegaard & Co. A/S, Oslo, Norway, a Norwegian body corporate
No Drawing. Filed Dec. 8, 1960, Ser. No. 74,485
Claims priority, application Norway, Dec. 8, 1959, 134,075/59
Int. Cl. C07c *103/30, 103/12*; A61k *27/08*
U.S. Cl. 260—518                                    9 Claims This invention relates to novel derivatives of 3,5-diamino-2,4,6-triiodobenzoic acid and a process for their preparation.

Water-soluble inorganic and organic salts of 3,5-diacetamido-2,4,6-triiodobenzoic acid have been used as X-ray contrast agents, because they are water-soluble and relatively non-toxic, while at the same time, on account of their high content of iodine, they are impervious to X-rays.

As early as 1896 Lütgens (Berichte 29, 2835) prepared 3,5-diamino-2,4,6-triiodobenzoic acid by iodinating 3,5-diaminobenzoic acid. 3,5-diamino-2,4,6-triiodobenzoic acid is, however, a rather unstable compound and has therefore proved unsuitable as X-ray contrast agent but acetylation of this compound (Am. Chem. Soc. 126th Meeting, New York, Sept. 6, 1954—Abstracts, p. 11–N; Larsen et al., Am. Soc. 78 (1956); Norwegian Patent No. 87,963) yields 3,5-diacetamido-2,4,6-triiodobenzoic acid which is more stable.

In the hitherto proposed methods for the production of diacetamido-triiodobenzoic acid 3,5-dinitrobenzoic acid is reduced to 3,5-diaminobenzoic acid, which is then iodinated to 3,5-diamino-2,4,6-triiodobenzoic acid. This compound is acetylated yielding 3,5-diacetamido-2,4,6-triiodobenzoic acid, which by neutralization with sodium hydroxide gives the water-soluble salt, sodium 3,5-diacetamido-2,4,6-triiodobenzoate.

Such a process is accompanied by the following disadvantages.

(1) Reduction of dinitrobenzoic acid can be effected either by (a) by hydrogenation in the presence of a noble metal catalyst (platina) under pressure of an aqueous solution of the sodium salt, after the solution has first been purified by boiling with Raney nickel, which is then filtered off, or (b) by heating with ammonium sulphide (exothermic reaction). In the former case pressure hydrogenation equipment is needed, and in the latter case there are the obvious drawbacks of working with large quantities of ammonium sulphide, and repeated purification operations requiring work and space are generally necessary for obtaining the desired diamino acid in sufficient purity for the subsequent iodination to diaminotriiodo benzoic acid.

(2) The iodination of diaminobenzoic acid to the diaminotriiodo acid was, as already mentioned, carried out as early as in 1896 by Lütgens who iodinated in alkaline solution. The unstable diaminotriiodo benzoic acid is obtained in varying, and as a rule, poor yields, the purity of the product being poor and tending to decrease the stability of the product. Iodination in acid medium, e.g. with iodine monochloride or potassium iododichloride (Larsen et al. etc. loc. cit.) seems to be an improvement but this process is difficult to control, and again affords the desired diaminotriiodo benzoic acid in varying yields of varying purity and stability. The product obtained is thus not very stable during storage.

(3) Acetylation of the sensitive diaminotriiodic acid is carried out under relatively drastic conditions by heating with an acetyl halide (acetyl chloride) or with acetic anhydride in the presence or absence of strong acids as catalysts (perchloric acid or sulphuric acid).

We have now found that several of the disadvantages of the above-described process may be reduced by proceeding by way of esters of substituted benzoic acids in place of the free acids previously used and finally converting the ester group to a carboxyl group.

We have further found that the lower alkyl esters of 3,5-diamino-2,4,6-triiodo-benzoic acid and of N-mono- and N,N'-di-alkyl diacyl 3,5-diamino-2,4,6-triiodo-benzoic acid are useful as X-ray contrast agents in fields where insoluble compounds of high X-ray impermeability are required. We have also found that the N,N'-dialkyl-3,5-diacylamino-2,4,6-triiodobenzoic acids and their salts are also generally of low solubility and these too may be used where low solubility is desired.

On the other hand, a number of salts of the N-monoalkyl-3,5-diacylamino-2,4,6-triiodobenzoic acids, in particular the N-methyl compound, are of unexpectedly high water-solubility and, being of low toxicity, are especially suitable as vascular X-ray contrast agents.

It is an object of the present invention therefore to provide a process for the production of 3,5-diacylamino-2,4,6-triiodobenzoic acids and of their N-lower alkyl and N,N'-di-lower alkyl derivatives which reduces the difficulties of the process described above and we have found that this object may be achieved by the process described below which proceeds by way of esters of substituted benzoic acids rather than by way of the free acids.

According to the present invention therefore there is provided a process for the preparation of compounds of the general formula

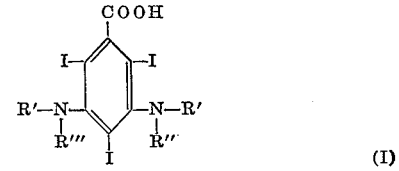

(I)

in which the groups R', which may be the same or different are acyl groups and R'' and R''', which may be the same or different, are hydrogen atoms or lower alkyl groups, in which a compound of the general formula

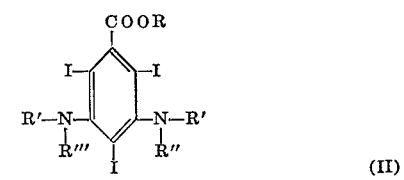

(II)

in which R represents an alkyl group and R', R'' and R''' have the above meanings, is reacted with an inorganic base and/or an amine, an amide or an imide.

We have found, however, that when a compound of Formula II in which R″ and R‴ are both hydrogen atoms is reacted with an inorganic base such as potassium hydroxide in the absence of an added amine, amide or imide, the alkyl group is not hydrolysed from the alkoxy carbonyl group but alkylates one of the amide nitrogen atoms. It is thus found that unalkylated 3,5-diacylamino-2,4,6-triiodobenzoic acid is also formed together with the monoalkylated acid and a much smaller quantity of N,N'-dialkylated acid. A separation of the reaction products may be achieved for example by chromatography or by fractional crystallisation of their salts e.g. their ammonium and pyridine salts a typical mixture ratio being 54% unalkylated, 40% mono-alkylated and 6% dialkylated product. Such a reaction in which a carbalkoxy group alkylates an acylamino group and which for convenience may be termed amidolysis has not previously been described.

If an alkyl N-alkyl 3,5-diacylamino-2,4,6-triiodobenzoate is reacted with an inorganic base in the absence of added amine, amide or imide, however, the amidolysis does not take place to the same extent and good yields of the N-alkyl-3,5-diacylamino-2,4,6-triiodobenzoate may be obtained. Alkyl N,N'-dialkyl-3,5-diacylamino-2,4,6-triiodobenzoic acid may be hydrolysed to the corresponding acids with an inorganic base the tendency of N-alkylation being greatly suppressed.

It is possible to avoid the above amidolysis and to obtain 3,5-diacylamino-2,4,6-triiodobenzoic acids substantially uncontaminated with N-alkyl derivatives by reacting their alkyl esters with an amine, amide or imide in the presence or absence of an inorganic base, the added N-derivative being alkylated in preference to the diacylaminotriiodobenzoic acid and its ester. Alkyl esters of N-alkyl and N,N'-dialkyl derivatives of 3,5-diacylamino-triiodobenzoic acids can also be converted to the free acid in this way. This reaction which should be termed "aminolysis" is preferably carried out at elevated temperature.

The inorganic base used in the hydrolysis or amidolysis reactions or in the aminolysis reaction in conjunction with an amine, amide or imide, may be, for example, an alkali metal hydroxide, e.g. sodium or potassium hydroxide. Where an inorganic base is used above the reaction is preferably carried out in aqueous solution and the base is preferably at high concentration, for example between 1 and 5 N. Where an added N-derivative is present, however, dilute solutions of inorganic base are preferred. It is found that the N-unalkylated and N-mono-alkylated esters used as starting material are generally soluble in aqueous alkali and are conveniently converted to the free acid in such a solution. The N,N'-dimethyl esters are generally insoluble in aqueous alkali and are more conveniently converted to the free acid by aminolysis in an organic solvent, for example, pyridine or in solution in an excess of the aminolysis reagent where this is a liquid at the reaction temperature.

It should be noted that the methyl ester is more reactive than the ethyl ester in the aminolysis and amidolysis described above and in general it is preferred to use methyl esters, the above described amidolytic reaction in absence of added N-derivative taking place insignificantly when, e.g., the ethyl ester is used.

Where an amine, amide or imide is utilised in the aminolysis reaction this may conveniently be, for example, methylamine, dimethylamine, trimethylamine, ethylene diamine, hydrazine, cyclohexylamine, piperidine, morpholine, ethanolamine, N,N'-dimethylaminoethanol, urea or phthalimide.

The esters of general Formula II used as starting materials may be prepared in any convenient way, advantageously by acylation of an ester of 3,5-diamino-2,4,6-triiodobenzoic acid followed, if required, by N-alkylation to produce an N-mono alkyl or N,N'-dialkyl-derivative. Acylation may be carried out by reacting the diamine with a suitable functional derivative of a carboxylic acid, for example, an acid halide or anhydride or a ketene. Thus, for example, acetyl chloride or propionyl chloride may be used in the presence of a basic substance or the diamine may reacted with a ketene to yield the diacetylamino derivative.

The alkylation may be carried out by reacting the diacylamino derivative with an alkylating reagent such as a dialkyl sulphate, an alkyl arylsulphonate or an alkyl halide. Although mixtures of unalkylated, mono-alkylated and di-alkylated derivatives may be obtained it is possible to obtain good yields of the mono-alkyl derivative where this is required, and di-alkylated esters can eventually be easily separated from mixtures by way of their insolubility in strong alkali.

In the production of N-methyl-3,5-diacetamido-2,4,6-triiodobenzoic acid it has been found particularly convenient to perform the reaction in such a way that methyl-3,5-diacetamido-2,4,6-triiodobenzoate, dissolved in alkali (5 equivalents 5 N potassium hydroxide) and with addition of an excess of methanolic methylhydrogensulphate (2 equivalents 1 molar solution), is boiled with distillation of the main quantity of the methanol (about 7/8), after which more alkali is added (about 5.25 equivalents KOH), and, further, heating of the mixture continues under reflux until the hydrolysis is complete (appr. 80 mins.) and a sample of the mixture no longer gives a precipitate of sparingly soluble ester by addition of glacial acetic acid. This mode of operation has the advantage that it affords good and reliable yields of N-methyl acid with large variations of the operating scale (1:100) and without the necessity of isolating the intermediary N-methyl ester.

The 3,5-diamino-2,4,6-triiodobenzoic acid ester used as starting material above may be obtained in any convenient way, advantageously by iodination of the corresponding ester of 3,5-diaminobenzoic acid. Thus, for example, an ester of 3,5-diaminobenzoic acid may be reacted with an iodinating agent such as iodine monochloride or potassium iodo-dichloride in acid medium.

The 3,5-diaminobenzoic acid ester used as starting material may be prepared in any convenient way, advantageously by reduction of an ester of 3,5-dinitrobenzoic acid, for example with hydrogen in the presence of a hydrogenation catalyst e.g. palladium or a metal/acid reducing system e.g. tin and methanolic hydrochloric acid.

Esters of 3,5-dinitrobenzoic acid may be obtained in any convenient way, advantageously by esterification of 3,5-dinitrobenzoic acid, for example using an appropriate alcohol in acid medium, e.g. in the presence of a strong acid such as hydrochloric or perchloric acid. The ester may often be used without isolation in the reduction by hydrogenation.

The process according to the present invention, in proceeding to the desired triiodobenzoic acid derivatives by way of esters of substituted benzoic acid possesses advantages over the earlier process for the production of 3,5 - diacetamido - 2,4,6 - triiodobenzoic acid in that the yields at each stage are generally good, ammonium sulphide is not used and does not interfere with iodination, the triiodoesters are easily isolated, generally by simple precipitation, these intermediate compounds are stable, in contrast to the instability of 3,5-diamino-2,4,6-triiodobenzoic acid and in that novel N-alkylated derivatives of 3,5-diacylamino-2,4,6-triiodobenzoic acids may be prepared which are of especial value.

The N-monoalkyl and N,N'-dialkylacylamino-2,4,6-triiodobenzoic acids may also be obtained, if desired, by alkylation of the unmethylated acid formed as above. Suitable alkylating agents include, for example, dialkyl sulphates, alkyl arylsulphonates, alkylhalides, etc., in aqueous or aqueous methanolic alkali. The alkyl groups of the alkylating agents may be lower alkyl, for example, methyl. Under strong alkylating conditions e.g. using excess dialkyl sulphate or high temperature, the N,N'- dialkyl derivatives and even their alkyl esters may be formed, for example, N,N'-dialkylacylamino-triiodobenzoic acids. While it is possible to obtain the monoalkyl acids in this way, it is difficult to avoid formation of N,N'-dialkyl derivatives at the same time and a separation step is generally required. It is also possible to esterify an N-monoalkyl 3,5-diacylamino - 2,4,6 - triiodobenzoic acid by using only a small excess of dialkyl sulphate or alkyl halide in alcohol solution, any N,N'-alkyl derivatives formed being easily separated as mentioned above.

The invention will now be described in greater detail by way of illustration only with particular reference to methyl derivatives which being of particular interest, are preferred.

Methyl 3,5-diaminobenzoate is iodinated to methyl 3,5-diamino-2,4,6-triiodobenzoate (itself a water-insoluble X-ray contrast agent), which on acetylation yields methyl 3,5-diacetamido-2,4,6-triiodobenzoate (an insoluble X-ray contrast agent), which under alkaline hydrolytic conditions by way of an amidolytic reaction gives a mixture of the valuable intravenous X-ray contrast agent 3,5-diacetamido-2,4,6-triiodobenzoic acid and the novel X-ray contrast agent according to the invention, N-methyl-3,5-diacetamido-2,4,6-triiodobenzoic acid as well as quite small quantities of a further novel contrast agent, N,N'-dimethyl-3,5-diacetamido-2,4,6-triiodobenzoic acid.

By simple separation methods (e.g. precipitation as ammonium salts and pyridine salts, as well as by extraction with alcoholic pyridine) the individual components can be separated, so that it becomes possible to produce pure 3,5-diacetamido-2,4,6-triiodobenzoic acid and N-methyl-3,5-diacetamidobenzoic acid or mixtures of these, which in the form of water-soluble salts (e.g. sodium or methylglucamine salt) are suitable for intravenous preparations.

By methylation (e.g. with dimethyl sulphate in methanolic sodium methylate) of 3,5-diacetamido-2,4,6-triiodobenzoic acid, methyl 3,5-diacetamido-2,4,6-triiodobenzoate is obtained, which makes possible the conversion by the process of the invention to N-methyl-3,5-diacetamido-2,4,6-triiodobenzoic acid.

For the production of unmixed compounds it has, however, been found particularly convenient to use another embodiment of the invention yielding 3,5-diacetamido-2,4,6-triiodobenzoic acid as sole reaction product, namely aminolysis of methyl 3,5-diacetamido-2,4,6-triiodobenzoate whilst N-methyl-3,5-diacetamido-2,4,6-triiodobenzoic acid (IXe) may be obtained by combined methylation and hydrolysis from 3,5-diacetamido-2,4,6-triiodobenzoic acid methyl ester as described above.

By mild methylation of methyl 3,5-diacetamido-2,4,6-triiodobenzoate in aqueous or aqueous methanolic alkaline medium the insoluble potential contrast agent methyl N-methyl-3,5-diacetamido - 2,4,6 - triiodobenzoate is obtained, and by further methylation of this or by more vigorous methylation of unmethylated ester methyl N,N'-dimethyl - 3,5 - diacetamido - 2,4,6 - triiodobenzoate is obtained, which is also an X-ray contrast agent.

By aminolysis of these methylated esters or by alkaline hydrolysis there are obtained the corresponding free acids, respectively the above mentioned N-methyl and N,N'-dimethyl-3,5-diacetamido - 2,4,6 - triiodobenzoic acids, which in the form of water-soluble salts (e.g. sodium or methylglucamine salts) are X-ray contrast agents.

Other embodiments of the process for making the N-methylated acids are based on a direct methylation of 3,5-diacetamido-2,4,6-triiodobenzoic acid (or eventually the N-monomethyl acid) for production of N-monomethyl, or the N,N'-dimethyl acid. By complete methylation of these acids above mentioned methyl N,N'-dimethyl-3,5-diacetamido - 2,4,6 - triiodobenzoate may be obtained.

According to a modification of the process of the present invention the new N-alkyl-3,5-diacetamido-2,4,6-triiodobenzoic acids may be prepared from 3-acylamino-5-amino-2,4,6-triiodobenzoic acid in two steps, 3-acylamino-5-amino-2,4,6-triiodobenzoic acid being alkylated to 3-(N-alkyl)-acylamino-5-amino-2,4,6 - triiodobenzoic acid, followed by acetylation of the latter compound to the required N-alkyl-3,5-diacylamino-2,4,6-triiodobenzoic acid according to the following formulae:

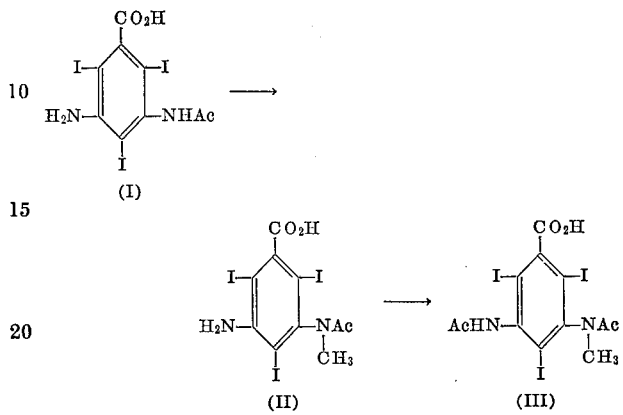

The alkylation may be carried out, for example, in alkaline aqueous solution by means of an alkylating agent, preferably at room temperature with an excess of dialkyl sulphate dissolved in acetone, the amount of alkylating agent, preferably chosen so as to exactly consume all starting material under the actual conditions of the synthesis, this amount being assessed by adding dimethyl sulphate until little or no starting material is found in the reaction mixture when this is applied to paper chromatography. Since the N-monomethyl derivative is a preferred compound according to the invention, the above process is preferably effected by a methylating agent.

Small amounts of alkyl ester of the 3-(N-alkyl)-acylamido-5-amino-2,4,6-triiodobenzoic acid may be formed, especially if a too large excess of alkylating agent is being used or if the reaction mixture is inhomogeneous during alkylation, e.g. by using too little solvent. The ester, however, can easily be converted into the acid by lysis, e.g. by alkaline hydrolysis or by aminolysis.

The acylation step may be carried out by means of an acid anhydride e.g. acetic anhydride in the presence of a strong acid, e.g. concentrated sulphuric acid or perchloric acid, as catalyst. Thus, a smooth, exothermic reaction takes place when 3-(N-methyl)-acetamido-5-amino-2,4,6-triiodobenzoic acid is covered with an excess of acetic anhydride, gently heated and a catalytic amount of concentrated sulphuric acid added. The required new compound, N-methyl-3,5-diacetamido-2,4,6 - triiodobenzoic acid separates as a colourless product when the reaction mixture adopts room temperature. Further amounts of reaction product can be collected on concentrating the mother liquor, preferably in vacuo. If ester eventually formed during the methylating step has not been separated, e.g. by addition of weak alkali in which it is insoluble, a small amount of the methyl ester of N-methyl-3,5-diacetamido-2,4,6-triiodobenzoic acid can be separated from the acylation mixture by means of its insolubility in weak alkali, and eventually be converted to the required acid by lysis, e.g. hydrolysis or aminolysis.

Of the new compounds which can be produced according to the invention N-alkyl, in particular N-methyl, 3,5-diacetamido-2,4,6-triiodobenzoic acids have proved to be promising contrast agents, the sodium salts of these acids having high iodine content, a high degree of solubility in water, low toxicity, and rapid and high secretion through the kidneys. As indicated above, however, sodium salts of the N,N'-dialkyl 3,5-diacylamino-2,4,6-triiodobenzoic acids are useful contrast agents of low water solubility and the 3,5-diamino-2,4,6-triiodobenzoic acid esters and their diacyl and N-mono alkyl and N,N'-dialkyl-diacyl derivatives used as intermediates are also useful X-ray contrast agents of low solubility.

According to a further feature of the invention therefore we provide compounds of the general formula

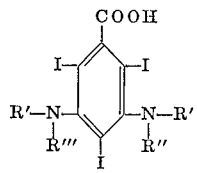

in which R' is an acyl group, R" is a hydrogen atom or a lower alkyl group and R'" is a lower alkyl group, and water-soluble, non-toxic salts and lower alkyl esters thereof.

As indicated above it is preferred that where R" and R'" are alkyl groups, they should be methyl groups. Salts of alkali metals or of organic bases such as methylglucamine or diethanolamine are preferred, where it is desired that the resulting salts should be water soluble. R' is preferably a lower acyl group e.g. a propionyl or advantageously an acetyl group.

A compound of particular interest according to the invention is N-methyl-3,5-diacetamido-2,4,6-triiodobenzoic acid, which has a high iodine content and low toxicity and further possesses the important advantage that its water-soluble salts, in particular the sodium salt, possess unexpectedly higher water-solubility than the corresponding salts of the known 3,5-diacetamido-2,4,6-triiodobenzoic. Thus for example the sodium salt of this new compound has a solubility in water at room temperature of 80–85 percent weight/volume, the viscosity of the saturated solution being low. The solubility of the sodium salts is of especial importance, because they combine the properties of low toxicity, low molecular weights, high iodine contents and low viscosity of their aqueous solutions. The methylglucamine and diethanolamine salts are also of particular utility. Furthermore, super-saturated (100 percent weight/volume) autoclaved solutions have been prepared which have remained stable, without any sign of crystallisation as yet for an observation period of six months. The low tendency of crystallisation may be supported by the acid being able to exist in two isomeric geometric forms, the equilibrium of which is reached after short heating above 50° C., the two forms being present at equilibrium in a ratio of about 15:85.

The unexpected solubility properties of the new compound of the present invention may be further stressed by pointing to the fact that the sodium salt of the further methylated compound, sodium N,N'-dimethyl-3,5-diacetamido-2,4,6-triiodobenzoate, is considerably *less* soluble (solubility about 17 percent in water at room temperature) than the known sodium 3,5-diacetamido-2,4,6-triiodobenzoate, the sodium salt of the new N-methyl-3,5-diacetamido-2,4,6-triiodobenzoic acid thus being the most soluble sodium salt among these substances.

In order that the invention may be well understood we give the following examples by way of illustration only.

EXAMPLE 1

Ethyl 3,5-diamino-2,4,6-triiodobenzoate 10.6 g. 3,5-dinitrobenzoic acid is dissolved in 80 ml. abs. ethanol, to which is added 0.25 ml. perchloric acid (70%). The mixture is then boiled under reflux for 5 hours. The ethanolic solution of ethyl 3,5-dinitrobenzoate (melting point 91° C.) passes then directly to hydrogenation at 50° C. in presence of 0.35 g. Pd. After completed absorption the palladium is filtered off, and the main quantity of ethanol is recovered. The concentrate of ethyl, 3,5-diaminobenzoate is then taken up in 10 ml. conc. hydrochloric acid in 350 ml. of water and is then iodinated at once. An isolated sample of the ethyl diaminobenzoate melted at 80–82° C., and its dihydrochloride at 223–26° C.

The iodination is effected under good agitation with 88 ml. of 2 N KICl₂ solution, and the agitation is continued for 2 hours after completed addition, before the separated substance, ethyl 3,5-diamino-2,4,6-triiodobenzoate is isolated. The crystallized substance is crisp with low moisture content, and is easy to dry. A sample recrystallized from ethanol melts at 105° C. The yield from 3,5-dinitrobenzoic acid is 23.7 g.~85%.

EXAMPLE 2

Ethyl 3,5-diacetamido-2,4,6-triiodobenzoate

Ethyl 3,5-diamino-2,4,6-triiodobenzoate 23.7 g., produced as in Example 1, is easily dissolved on the steam bath in 100 ml. acetic anhydride. At 50° C. a few drops concentrated sulphuric acid are added, whereby the temperature increases to nearly 70° C., while at the same time heavy precipitation takes place. The mixture is heated for a short time up to 80–90° C., and is then agitated uninterruptedly whilst cooling down until about 90% of the substance can be isolated. After washing with acetic anhydride and reprecipitation from hot 5% sodium hydroxide with acetic acid, the substance weighed 22 g. dry. This product of ethyl 3,5-diacetamido-2,4,6-triiodobenzoate melted under decomposition at 290–295° C. and showed an iodine content of 58.9% as compared with a calculated 59.3%.

EXAMPLE 3

Methyl 3,5-diamino-2,4,6-triiodobenzoate 10.6 g. 3,5-dinitrobenzoic acid is dissolved by warming in 70 ml. methanol, to which is added 0.25 ml. HClO₄. The mixture is then boiled under reflux for 6 hours. An isolated sample of the methyl 3,5-dinitrobenzoate thus formed melted at 108–110° C. The mixture passed then directly to hydrogenation at 50° C. in the presence of 0.35 g. Pd. After absorption of 6 mol hydrogen gas, the catalyst is filtered off and the greater part of the methanol recovered in vacuum.

The concentrate of methyl 3,5-diamino-benzoate (melting point 121–122° C.) is now taken up in 9 ml. conc. HCl in 350 ml. cold water, and is at once iodinated under agitation with 88 ml. 2 N KICl₂ solution. The agitation is continued for 2 hours after complete addition, before the well-developed, separated crystals of methyl 3,5-diamino-2,4,6-triiodobenzoate are isolated. The compound appears to be very stable, and needs by reason of its low moisture content a minimum of drying to enable it to be acetylated.

Yield: 23 g.~85% from dinitrobenzoic acid. A sample recrystallized from methanol melts at 142–3° C.

EXAMPLE 4

Methyl 3,5-diamino-2,4,6-triiodobenzoate 10 g. of methyl 3,5-dinitrobenzoate is dissolved without warming in 80 ml. glacial acetic acid, to which is then added 2 ml. PdCl₂ solution of strength 2.67 g. Pd/100 ml., and the mixture is hydrogenated at normal pressure and room temperature. After 6–8 hours absorption is complete, the catalyst is filtered off and the acetic acid solution of methyl 3,5-diaminobenzoate is ready for iodination, as described above (Example 3).

EXAMPLE 5

Methyl 3,5-diamino-2,4,6-triiodobenzoate 20 g. of methyl 3,5-dinitrobenzoate is dissolved in 200 ml. methanol and hydrogenated at 40° C. at normal pressure and in presence of 0.7 g. Pd. After completed absorption (approx. 8 hours), the catalyst is filtered off, the methanol recovered and the methyl 3,5-diaminobenzoate is taken up in hydrochloric acid and water. It is now ready for iodination with 2 N KICl₂ solution, as described in Example 3. An isolated sample of the dihydrochloride of the methyl ester melted at 234–6° C.

EXAMPLE 6

Methyl 3,5-diamino-2,4,6-triiodobenzoate 9 g. of methyl 3,5-dinitrobenzoate is dissolved in 90 ml. hot methanol (kept at boiling point). 15 g. tin powder is covered with 300 ml. HCl conc. and placed in steam bath. The hot methanolic solution is added in portions. A powerful reaction occurs and the solution becomes darker in colour. This slows down, however, rather quickly and more nitro-ester solution can be added. After all has been added the reaction mixture is kept on the steam bath until the dark colour has disappeared and the solution is yellow-green and all the tin has been consumed. A somewhat faster reaction may be obtained toward the end by adding a little more hydrochloric acid.

The reaction mixture is evaporated in vacuum. The residue, a viscous amorphous mass, is dissolved in water and the tin salt removed by addition of alkali (NH$_4$OH conc.) under agitation to pH 4. This can probably with advantage be performed in the hot state, as the amino ester is then more easily soluble.

Precipitated tin hydroxide is filtered off, the filtrate is made acid by means of hydrochloric acid and is ready for iodination, as described in Example 3.

The methyl 3,5-diaminobenzoate can be isolated by adding still more ammonia to the filtrate. The ester then precipitates, melting point 121–122° C.

EXAMPLE 7

Methyl 3,5-diacetamido-2,4,6-triiodobenzoate

Methyl 3,5-diamino-2,4,6-triiodobenzoate (22 g.) produced as in Example 3, is easily dissolved on the steam bath in 66 ml. acetic anhydride.

At 50° C. a few drops of concentrated sulphuric acid are added under agitation, and the whole mixture is heated briefly to 80–90° C., before cooling and isolation of the separated substance. After washing with acetic anhydride, and effective washing of same with acetone, the substance weighed 21 g. dry. The diacetylated methyl ester (18 g.) is obtained by reprecipitation from hot 5% sodium hydroxide by acidification with acetic acid. The compound is decomposed at 263–265° C. and exhibits an iodine content of 60.15%, calculated 60.65%.

EXAMPLE 8

Methyl 3,5-dipropioamido-2,4,6-triiodobenzoate 2.72 g. of methyl 3,5-diamino-2,4,6-triiodobenzoate prepared as in Example 3, is dissolved under careful heating in 8.2 ml. propionic acid anhydride to which is added a drop of conc. sulphuric acid. After being allowed to stand for some time it is cooled, filtered and washed on the filter with alcohol and with ether. After being dried in air 2.2 g. of methyl 3,5-dipropioamido-2,4,6-triiodobenzoate is obtained. The product is light lilac-grey coloured, insoluble in boiling methanol, soluble in warm pyridine and in strong potassium hydroxide.

EXAMPLE 9

3,5-diacetamido-2,4,6-triiodobenzoic acid

To 0.5 g. of methyl 3,5-diacetamido-2,4,6-triiodobenzoate prepared as in Example 7 is added 1 ml. 70% ethylenediamine; the mixture is heated to boiling point, until all has dissolved in the course of a few minutes. 2 ml. of water is added and the mixture then acidified with glacial acetic acid, decolourised hot with carbon and filtered. After cooling hydrochloric acid (1:2) is added to pH 1–0.5 and the mixture stirred for a couple of hours. The precipitated 3,5 - diacetamido - 2,4,6-triiodobenzoic acid amounts to 0.3 g. after filtration, washing and drying.

EXAMPLE 10

3,5-diacetamido-2,4,6-triiodobenzoic acid 0.5 g. of methyl 3,5-diacetamido-2,4-6-triiodobenzoate, prepared as in Example 7, is dissolved hot in morpholine and boiled under reflux for 6 hours. The morpholine is then distilled off in vacuum and the residue dissolved in a little aqueous alkali acidified with glacial acetic acid and filtered. The filtrate is decolourised hot with carbon and precipitated with hydrochloric acid, which is added to pH 1–0.5. The precipitated 3,5-diacetamido-2,4,6-triiodobenzoic acid is washed and dried.

EXAMPLE 11

3,5-diacetamido-2,4,6-triiodobenzoic acid

As in Example 10, using piperidine instead of morpholine.

EXAMPLE 12

3,5-diacetamido-2,4,6-triiodobenzoic acid 1.00 g. of methyl 3,5-diacetamido-2,4,6-triiodobenzoate, prepared according to Example 7, is mixed under agitation with 1 ml. ethanolamine, after which the mixture is heated and the temperature maintained at 120–130° C. for ten minutes. The mixture is then cooled and conc. hydrochloric acid added to pH 1–0.5, and stirred for 24 hours. After filtration, washing with a little water and drying 0.62 g. 3,5-diacetamido-2,4,6-triiodobenzoic acid is obtained.

EXAMPLE 13

3,5-diacetamido-2,4,6-triiodobenzoic acid 1.00 g. of methyl 3,5-diacetamido-2,4,6-triodobenzoate, produced as in Example 7, is heated for three hours under stirring with a mixture of 3.5 ml. of ethanolamine, 1 ml. 5 N KOH and 4 ml. of water. After cooling it is acidified with glacial acetic acid. After standing for a short time it is filtered and to the filtrate is added conc. hydrochloric acid to pH 1–0.5. After 24 hours agitation it is filtered and washed with a little water. After drying, 0.520 g. 3,5-diacetamido-2,4,6-triiodobenzoic acid is obtained.

EXAMPLE 14

3,5-diacetamido-2,4,6-triiodobenzoic acid 1.00 g. of methyl 3,5-diacetamido-2,4,6-triiodobenzoate, prepared as in Example 7, is mixed with 1 ml. 5 N potassium hydroxide, 2 ml. of water and 0.6 ml. of 33% trimethylamine and kept for 20 hours at 55° in a closed flask. It is then cooled and glacial acetic acid added to pH about 3–4. After short standing the solution is filtered from unchanged ester (0.46 g.) and the filtrate added hydrochloric acid to pH 1–0.5. After agitation overnight the sediment is collected on a filter, washed with a little water and dried, rivative. Acylation may be carried out by reacting the di- is obtained.

EXAMPLE 15

3,5-diacetamido-2,4,6-triiodobenzoic acid 1 g. of methyl 3,5-diacetamido-2,4,6-triiodobenzoate, prepared according to Example 7, is mixed with 0.5 ml. 33% methylamine, 1 ml. 5 N potassium hydroxide and 2 ml. of water and heated to 55° for 20 hours in a closed container, and worked up as described in Example 14. 0.62 g. of unexchanged ester and 0.28 g. of 3,5-diacetamido-2,4,6-triiodobenzoic acid are obtained.

EXAMPLE 16

3,5-diacetamido-2,4,6-triiodobenzoic acid

A mixture of 100.0 g. of methyl 3,5-diacetamido-2,4,6-triiodobenzoate prepared according to Example 7, 90 ml. 5 N potassium hydroxide (f=1.005), 50 ml. of 33% dimethylamine and 400 ml. water is stirred at room temperature until all is dissolved, and is then heated in a closed container to 55° for 19–20 hours. The wine-red solution is cooled and a sample gives no precipitate on acidification with glacial acetic acid. 5 N hydrochloric acid (200–210 ml.) is added to pH 1–0.5 under mechanical stirring. Agitation continues overnight, whereafter it is filtered and washed with a little water.

The almost colourless crude product (94 g. dry), is stirred into 500 ml. of water and caused to dissolve by addition of 2 N soda solution. pH is adjusted to 5–6, and the solution is treated with active carbon at 45–50° and filtered. After cooling, 5 N hydrochloric acid is added under mechanical stirring to pH 1–0.5. The agitation continues overnight, after which the precipitate is filtered off, washed with a little distilled water and dried to constant weight. 92 g. of chromatographically pure, colourless 3,5-diacetamido-2,4,6-triiodobenzoic acid is obtained, melting point 290–295° (decomp.), I=61.7% (calcd. 62.1); N=4.75% (calcd. 4.56). Equiv. weight=630 (calcd. 614).

Further purification can, if necessary, be effected, for example according to any one of the following methods or a combination of them: (a) by boiling the moist product with equal parts of methanol, whereby the substance is again precipitated in a pure state after transitory dissolution. (b) extraction with ethanol; or (c) reprecipitation over ammonium salt. In these ways a yield of approx. 60% pure, 3,5-diacetamido-2,4,6-triiodobenzoic acid is obtained.

EXAMPLE 17

3,5-diacetamido-2,4,6-triiodobenzoic acid 1.00 g. of methyl 3,5-diacetamido-2,4,6-triiodobenzoate prepared according to Example 7 and recrystallized from glacial acetic acid, is mixed with 1 ml. 5 N potassium hydroxide, 0.45 ml. 33% dimethylamine and 2 ml. of water in a glass ampoule, which is resealed and shaken until all is dissolved. After 10 days at room temperature (about 20°) the reaction is completed. The clear solution with slightly pink colour is precipitated under agitation with hydrochloric acid to pH 1–0.5. After agitation for some hours the precipitate is separated by filtration, washed with a little distilled water and dried. The chromatographically pure, colourless 3,5-diacetamido-2,4,6-triiodobenzoic acid weighs 0.970 g. (99.4%).

EXAMPLE 18

3,5-diacetamido-2,4,6-triiodobenzoic acid

To 1 g. of ethyl 3,5-diacetamido-2,4,6-triiodobenzoate from Example 2 is added 1 ml. 5 N potassium hydroxide, 0.7 ml. 33% dimethylamine and 2 ml. of water, and the mixture heated to 60–65° C. in a closed ampoule for 20 hours. After cooling, glacial acetic acid is added to pH 4–5 and 0.6 g. of unexchanged ester filtered off. To the filtrate is added with stirring hydrochloric acid to pH 1–0.5. After standing for a while the precipitate is filtered, washed and dried, whereby 0.3 g. of 3,5-diacetamido-2,4,6-triiodobenzoic acid is obtained.

EXAMPLE 19

Mixture of 3,5-diacetamido-2,4,6-triiodobenzoic acid and N-methyl-3,5-diacetamido-2,4,6-triiodobenzoic acid 10 g. of methyl 3,5-diacetamido-2,4,6-triiodobenzoate prepared in Example 7, is heated in 20 ml. 4.3 N potassium hydroxide for 75 minutes at 100°, the reaction mixture diluted with water to 80 ml. volume, neutralized with glacial acetic acid (whereby no ester separation takes place) and further precipitated with concentrated hydrochloric acid to pH about 0.5. After stirring at room temperature until next day it is filtered and dried, whereby 9.2 g. of crude hydrolysate is obtained, consisting of approximately equal parts of 3,5-diacetamido-2,4,6-triiodobenzoic acid and N-methyl-3,5-diacetamido-2,4,6-triiodobenzoic acid together with a much smaller quantity of N,N' - dimethyl-3,5-diacetamido-2,4,6-triiodobenzoic acid, for example in proportion 54:40:6, determined by quantitative ultraviolet absorption analysis of eluates from paper chromatograms performed in n-butanol:ethanol:ammonia-water (4:1:2:1).

EXAMPLE 20

Mixture of 3,5-diacetamido-2,4,6-triiodobenzoic acid and N-methyl-3,5-diacetamido-2,4,6-triiodobenzoic acid 10 g. of methyl 3,5-diacetamido-2,4,6-triiodobenzoate, prepared as in Example 7, is heated in 20 ml. 4.3 N potassium hydroxide for 5 minutes at 120°. After dilution with water and neutralization with glacial acetic acid as described in Example 19, no ester separation is obtained. Further, precipitation with hydrochloric acid, as described above (Example 19), gives 9.25 g. dry mixture of 3,5-diacetamido-2,4,6-triiodobenzoic acid and N-methyl-3,5-diacetamido-2,4,6-triiodobenzoic acid in approximately the same ratio as in the preceding example.

EXAMPLE 21

Separation of a mixture of 3,5-diacetamido-2,4,6-triiodobenzoic acid and N-methyl-3,5-diacetamido-2,4,6-triiodobenzoic acid 22 g. of crude hydrolysate, prepared as described in Example 19, is suspended cold in 130 ml. of water and titrated to complete dissolution with 3.2 ml. concentrated ammonia water to pH about 6. After decoloration with 2 g. carbon in the heat, it is filtered and 15 g. of ammonium chloride is added to the filtrate. By stirring, ammonium 3,5-diacetamido-2,4,6-triiodobenzoate is gradually precipitated. After 4 days 7.5 g. of this compound is isolated, suspended in water and the acid set free by addition of hydrochloric acid to pH about 0.5, filtered, washed and dried.

The motor liquor from the 7.5 g. ammonium salt precipitation is acidified to pH about 0.5 with hydrochloric acid and 12.6 g. of precipitate isolated after filtration, washing and drying. For isolation of N-methyl-3,5-diacetamido-2,4,6-triiodobenzoic acid the precipitate is treated, for example, in one of the following two ways:

(a) 6.3 g. of the 12.6 g. of precipitate is dissolved completely in a mixture of 5.3 ml. of water and 0.85 ml. of pyridine by heating. By cooling to room temperature the separation of the desired pyridine salt commences immediately. After 2 days' agitation the substance is isolated and washed with methanol. The pyridine salt is precipitated in water with hydrochloride acid to pH about 0.5, stirred, filtrated, washed and dried. 2.65 g. of N-methyl-3,5-diacetamido-2,4,6-triiodobenzoic acid, melting point 265° (I=60.3%, calcd. 60, 65%; N=4.43%, calcd. 4.46%; equiv.=642, calcd. 628) is isolated.

(b) A mixture of 6.3 g. of the 12.6 g. precipitate described above, 31.5 ml. ethanol and 0.85 ml. pyridine is boiled with stirring for 3 hours, whereby the pyridine salt of N-methyl - 3,5 - diacetamido-2,4,6-triiodobenzoic acid remains undissolved. After cooling, the substance is suction-filtered and washed with ethanol and with ether. To the substance water and hydrochloric acid are added to pH about 0.5. After stirring, filtration, washing and drying, 3.5 g. of N-methyl-2,4,6-triiodobenzoic acid is isolated, melting point 263–265°. If a paper chromatogram (butanol-NH₃-water-ethanol) still shows impurities, the extraction is repeated.

EXAMPLE 22

N-methyl-3,5-diacetamido-2,4,6-triiodobenzoic acid 502.4 g. (0.8 mol) of methyl 3,5 - diacetamido - 2,4,6-triiodobenzoate from experiments performed as described in Example 7 is dissolved in 800 ml. 5 N aqueous potassium hydroxide (4 mol) by mechanical agitation and gentle heating. All material dissolves and the solution is cooled to room temperature whereafter 1600 ml. of molar methanolic methylsulphuric acid is added with stirring. The mixture is heated on boiling water bath for 10 minutes under reflux cooling. Then the heating continues on the boiling water bath with descending condenser. After about 2 hours about 1420 ml. has distilled over at 72–82°. Some solid substance has precipitated, and a further 200 ml. (1 mol) 5 N potassium hydroxide and 22 g. of solid (85%) potassium hydroxide are added, after which heating on boiling water bath continues with descending cooler. After 80 minutes a sample of the mixture gives, after addition of glacial acetic acid to pH about 4.5, no longer any precipitate. Altogether about 1560 ml. distillate has been collected.

The heating is suspended and to the dark-brown mixture is added 500 ml. of water. After cooling to room temperature, the precipitated substance is filtered by suction on a glass filter and washed with 250 ml. of water. The two filtrates are combined and filtered. To this clear, brown, filtered liquid (1920 ml.) is added with mechanical stirring 970 ml. of dilute hydrochloric acid (1:2) to pH about 4. After standing overnight the solution is filtered from a voluminous, chocolate-brown precipitate, which is washed with 400 ml. water. Filtrate and washings are combined and 70 g. of carbon (index 35) added, heated to boiling and filtered. The filtrate is washed with about 1000 ml. of water and the two filtrates combined. To the tea-coloured solution is added about 250 ml. dilute hydrochloric acid (1:2) with mechanical stirring to pH 1–0.5. After agitation overnight it is filtered on a sintered plate (G 4) and the precipitate washed twice with water (500 ml. and 300 ml.), and dried to constant weight over phosphorous pentoxide in vacuum. The slightly yellowish substance weighs 378 g. (76.6%) and consists of approx. 85% N-methyl-3,5-diacetamido-2,4,6-triiodobenzoic acid, admixed with about 5% 3,5-diacetamido-2,4-6-triiodobenzoic acid and about 15% N,N'-dimethyl-3,5-diacetamido-2,4,6-triiodobenzoic acid. 3 g. of this product is extracted twice with pyridine-containing alcohol. The undissolved pyridine salt is treated with diluted hydrochloric acid, washed and dried, whereby 56% chromatographically pure N-methyl-3,5-diacetamido-2,4,6-triiodobenzoic acid is obtained. By processing of the alcoholic mother liquors this compound can be obtained in a yield of 30–40%, calculated on the basis of dinitrobenzoic acid.

EXAMPLE 23

Methyl N,N'-dimethyl-3,5-diacetamido-2,4-6-triiodobenzoate 50 g. of methyl 3,5-diacetamido-2,4,6-triiodobenzoate, prepared as in Example 7, is dissolved in a mixture of 50 ml. 5 N potassium hydroxide (f=1.00) and 200 ml. of water by careful heating under mechanical stirring. At 48–50° 21.5 ml. of dimethylsulphate is added under constant stirring, 12–16 drops per minute. After the solution has become neutral, it is heated for 5 minutes to 55–65°. The product is filtered off, extracted hot for a few minutes with 2 N potassium hydroxide, cooled, filtered, washed and dried, whereby 50.0 g. (94%) pure N,N'-dimethyl-3,5-diacetamido-2,4,6-triiodobenzoic acid methyl ester is isolated.

EXAMPLE 24

N,N'-dimethyl-3,5-diacetamido-2,4,6-triiodobenzoic acid 60 g. of methyl N,N'-dimethyl-3,5-diacetamido-2,4,6-triiodobenzoate (prepared as in Example 23) is heated in a closed reaction vessel with 60 ml. of pyridine and 42 ml. 33% dimethylamine to 100° for 2½–3 hours.

After being cooled to room temperature the contents are washed over into a beaker with a little water and 4–5 N hydrochloric acid acidified with hydrochloric acid to pH 5 and decolourised with active carbon at 50–55°. To the filtrate is added an additional quantity of 4–5 N hydrochloric acid under mechanical agitation to pH 1–0.5. After about an hour the mixture is filtered and washed with water, dried and weighed. 55 g. (93.7%) N,N'-dimethyl-3,5-diacetamido-2,4,6-triiodobenzoic acid is isolated.

EXAMPLE 25

3,5-dipropioamido-2,4,6-triiodobenzoic acid 250 mg. of methyl 3,5-diproprioamido-2,4,6-triiodobenzoate from Example 8 is heated in a mixture of 0.5 ml. pyridine and 0.3 ml. 33% dimethylamine for two hours at 100°. The clear solution is diluted with 5 ml. of water and precipitated with 5 N hydrochloric acid to pH 1–0.5. The precipitated acid is filtered, washed and dried and compared chromatographically with authentic 3,5-dipropioamido-2,4,6-triiodobenzoic acid, with which it proves identical.

EXAMPLE 26

Methylation of 3,5 - diacetamido-2,4,6 - triiodobenzoic acid to N-methyl - 3,5 - diacetamido - 2,4,6 - triiodobenzoic acid and N,N' - dimethyl - 3,5 - diacetamido-2,4,6-triiodobenzoic acid 1.23 g. (2 millimol) of 3,5-diacetamido - 2,4,6 - triiodobenzoic acid is dissolved in 2.4 ml. 5 N potassium hydroxide (12 millimol). 4.0 ml. molar methanolic methylsulphuric acid ($CH_3HSO_4$) is added, and the mixture heated on boiling water bath for 30 minutes under a slow stream of nitrogen, slightly reduced pressure and descending condenser. Hot water is added until the solution (6 ml.) becomes clear, after which dilute hydrochloric acid (1:2) is added with stirring to pH 1–0.5. The precipitated substance is filtered, washed and dried, and amounts then to 1.09 g. (86.6%) of a substance which by chromatography is found to contain about 10% unchanged starting material, 50–60% N-methyl-3,5-diacetamido - 2,4,6 - triiodobenzoic acid and 30–40% N,N'-dimethyl - 3,5 - diacetamido - 2,4,6 - triiodobenzoic acid.

EXAMPLE 27

Methyl N-methyl-3,5-diacetamido-2,4,6-triiodobenzoate 1.00 g. of N-methyl - 3,5 - diacetamido - 2,4,6 - triiodobenzoic acid is suspended in 4 ml. of abs. methanol and dissolved by addition of sodium methylate (from 37.5 mg.=1 equiv. Na) in 1 ml. methanol.

After addition of 0.175 ml. (1.13 equiv.) dimethyl sulphate the solution is heated to boiling point. After about 45 minutes there is added a further 0.4 equiv. methanolic sodium methylate and 70 microlitres of dimethyl sulphate. After boiling for a further period of two hours the mixture is cooled in the refrigerator and filtered. The filtrate is evaporated to dryness in vacuum, combined with the precipitate from the filter and suspended in 0.5 molar sodium carbonate, filtered, washed and dried. Thus is isolated 0.69 g. N-methyl-3,5-diacetamido-2,4,6-triiodobenzoic acid methyl ester, which is freed from small amounts of N,N'-dimethyl ester by reprecipitation from aqueous caustic alkali. By heating with two volumes 5 N potassium hydroxide to 100° for one hour the ester is hydrolyzed to N - methyl - 3,5-diacetamido-2,4,6-triiodobenzoic acid.

EXAMPLE 28

3-acetamido-5-amino - 2,4,6 - triiodobenzoic acid (2 g.) was suspended in 2 ml. of water and dissolved by adding 2.6 ml. of 5 N KOH. Dimethyl sulphate (0.6 ml.; 1.82 equiv.) dissolved in acetone (0.8 ml.) was added in portions with stirring. After a few minutes the solution became homogeneous. Stirring was continued for 1 hour after which dilute hydrochloride acid (1:1) was added to pH about 0.5, the precipitate filtered, washed with water and dried in vacuo. 3-(N-methyl)-acetamido-5-amino - 2,4,6 - triiodobenzoic acid (2.0 g.; 97%) was collected as a colourless powder, M.P. 275° C. This product (1.0 g.) was suspended in acetic anhydride (2.5 ml.) and warmed gently whereafter one drop of concentrated sulphuric acid was added. The mixture became transiently clear and was boiled for about 2 minutes whereby about half of the acetic anhydride distilled off. After the mixture had adopted room temperature the crystallised material was filtered, washed with little acetic anhydride, suspended in water (about 5 ml.) and concentrated ammonia added to strongly alkaline reaction and the mixture heated to boiling. About 50 mg. of insoluble methyl N-methyl - 3,5 - diacetamido - 2,4,6 - triiodobenzoate remained on the filter, and concentrated hydrochloric acid was added to the filtrate whereby N-ethyl - 3,5 - diacetamido - 2,4,6 - triiodobenzoic acid precipitated, weighing 0.9 g. (about 84%), M.P. 261° C., I=60.9% (61.5; 60.3%), calcd. 60.65%; N=4.45% (4.47; 4.43%), calcd. 4.46% after washing with water and drying in vacuo. A further quantity of the same substance could be recovered on concentration of the mother liquors.

EXAMPLE 29

Methyl N-methyl - 3,5 - diacetamido - 2,4,6 - triiodobenzoate (9 g.) was suspended in 3 N KOH (9 ml.) and water (19 ml.) added. To the mixture was added N-dimethylaminoethanol (2 ml.; about 1.4 equiv.) and heated in the boiling water bath. The ester dissolved rapidly and the reaction was completed after 2½ hours. Then the solution was diluted with water to about 70 ml. and acidified by means of concentrated hydrochloric acid to pH about 0.5. After being filtered, washed with water and dried the N-methyl- 3,5 - diacetamido - 2,4,6-triiodobenzoic acid weighed 6.6 g. (75%).

EXAMPLE 30

Methyl 3-(N-methyl)-acetamido - 5 - amino - 2,4,6-triiodobenzoate was aminolysed as described in Example 29 and worked up in the same way yielding 3-(N-methyl)-acetamido - 5 - amino - 2,4,6 - triiodobenzoic acid.

We claim:

1. A compound selected from the group consisting of an acid of the formula

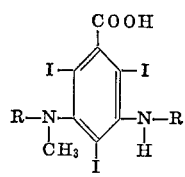

wherein R is lower alkanoyl and water-soluble non-toxic salts of said acid.

2. N-methyl - 3,5 - diacetamido - 2,4,6-triiodobenzoic acid.

3. A water soluble non-toxic salt of N-methyl - 3,5-diacetamido - 2,4,6 - triiodobenzoic acid.

4. Sodium N-methyl - 3,5 - diacetamido - 2,4,6-triiodobenzoate.

5. A process for the preparation of a compound of the formula

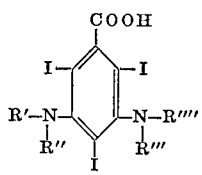

wherein R' is lower alkanoyl, R" is lower alkyl, R'" is a member selected from the group consisting of hydrogen and lower alkyl and R"" is a member selected from the group consisting of hydrogen and lower alkanoyl, comprising reacting in an alkaline aqueous medium, a compound of the formula

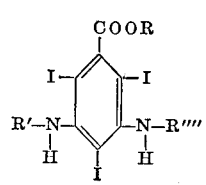

wherein R' and R"" have the same meaning as above and R is a member selected from the group consisting of hydrogen and methyl with an alkylating agent selected from the group consisting of: (a) a lower alkyl halide; (b) a lower dialkyl sulphate; (c) a lower alkyl hydrogen sulphate; and (d) a lower alkyl arylsulphonate; and when in said second-mentioned formula R is methyl and R"" is lower alkanoyl, (e) a compound of the formula

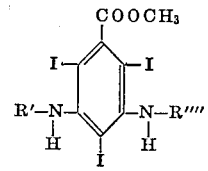

wherein R' and R"" are lower alkanoyl: R'" and R"" of said first-mentioned formula being hydrogen when R"" of said second-mentioned formula is hydrogen.

6. The process of claim 6 in which in said second-mentioned compound R is methyl, R' and R"" are acetyl and said alkylating agent is dimethyl sulphate.

7. The process of claim 5 in which in said second-mentioned compound R is hydrogen, R' and R"" are acetyl and said alkylating agent is dimethyl sulphate.

8. A process for the preparation of a compound of the formula

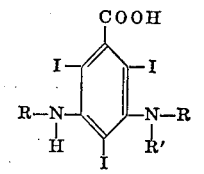

wherein R is lower alkanoyl and R' is lower alkyl, comprising reacting in an alkaline aqueous medium, a compound of the formula

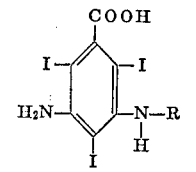

wherein R has the same meaning as above with an alkylating agent selected from the group consisting of a lower alkyl halide, a lower dialkyl sulphate, a lower alkyl hydrogen sulphate and a lower alkyl arylsulphonate to produce a compound of the formula

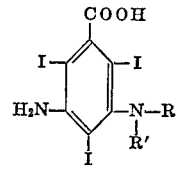

wherein R has the same meaning as above and R' is lower alkyl; and reacting said last-mentioned compound with an acylating agent selected from the group consisting of a halide of a lower alkanoic acid and the anhydride of a lower alkanoic acid.

9. The process of claim 8 in which in said second-mentioned compound, R is acetyl, said alkylating agent is dimethyl sulphate and said acylating agent is acetic anhydride.

References Cited

UNITED STATES PATENTS 3,076,024  1/1963  Larsen _____ 260—518 XR

FOREIGN PATENTS 1,172,953  2/1959  France.
779,500  7/1957  Great Britain.

(Other references on following page)

OTHER REFERENCES

Hickinbottom: Reactions of Org. Compounds, pp. 255-2517, 227-231 (London, 1948).

Theilheimer: Synthetic Methods of Organic Chem., vol. 11, pp. 125-126; vol. 13, p. 251; vol. 9, p. 214 (1955).

Wallingford et al.: J. Am. Chem. Soc., vol. 74, pp. 4365-8 (1952).

Larsen et al.: Jacs 78, 3210-16 (1956).

LORRAINE A. WEINBERGER, Primary Examiner

L. A. THAXTON, Assistant Examiner

U.S. Cl. X.R.

260—471, 501.11, 999